(12) United States Patent
Jepsen et al.

(10) Patent No.: US 6,724,815 B1
(45) Date of Patent: Apr. 20, 2004

(54) METHOD AND APPARATUS FOR INCREASING DATA RATE BY REDUCTION OF TRAINING DATA

(75) Inventors: Rene Jepsen, Swindon (GB); Behzad Mohebbi, Cambridge Park (GB); Howard Benn, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/486,137
(22) PCT Filed: Sep. 28, 1998
(86) PCT No.: PCT/EP98/06186
§ 371 (c)(1),
(2), (4) Date: Sep. 28, 2000
(87) PCT Pub. No.: WO99/17563
PCT Pub. Date: Apr. 8, 1999

(30) Foreign Application Priority Data

Sep. 29, 1997 (GB) .............................................. 9720587

(51) Int. Cl.[7] .............................................. H04B 17/00
(52) U.S. Cl. ...................................................... 375/225
(58) Field of Search .............................. 375/225, 224, 375/227, 228, 219, 130, 316

(56) References Cited

U.S. PATENT DOCUMENTS 6,337,855 B1 * 1/2002 Malkamaki .................. 370/347

* cited by examiner

Primary Examiner—Khai Tran

(57) ABSTRACT

A method is provided for improving the data throughput of a communication system (100) operating under different radio propagation conditions and with radio equipment with different training data requirements. The data rate is increased by optimising the training data structure (205) for the individual radio channel (105) rather than globally employing a worst case training data structure(205). The invention is applicable to the GSM cellular communication system where increased data rate is achieved by setting up links with midamble (205) replaced by user data (203) when allowed by the propagation conditions.

10 Claims, 2 Drawing Sheets

METHOD AND APPARATUS FOR INCREASING DATA RATE BY REDUCTION OF TRAINING DATA

FIELD OF THE INVENTION

The present invention relates to a method of and apparatus for increasing data rate in a communication systems comprising at least one central station and a number of remote units and in which receiver channel estimation is aided by including known data in the transmission. The invention is applicable to, but not limited to the Global System for Mobile communication (GSM) cellular network.

BACKGROUND OF THE INVENTION

Communication systems exist in which receiver channel estimation (including phase and timing synchronisation as a special case) is performed by including known data in the transmission, in the following referred to as training data. Typically these systems use a predetermined training data structure which is common for all users and in all environments. As a consequence it is necessary to design the training data to operate satisfactorily in the worst case situation. A training data structure typically consists of sequences of predetermined training symbols inserted in the data stream at predetermined intervals.

As an example, the GSM cellular communication standard includes predetermined training data in form of a midamble in all data bursts. This midamble has been designed so that it will provide suitable channel estimation for the worst case environment specifically in terms of the maximum delay spread and minimum time coherency. The typical GSM receiver demodulates data by performing a new channel estimate for every new burst regardless of the channel estimate for the previous burst. This is necessary for a fast moving mobile in an urban environment where the burst to burst coherency is negligible. For other environments, such as the low speed indoor environment, the burst to burst coherency is quite significant and the delay spread negligible. Communication systems such as GSM however include the same training data irrespectively of the specific requirements in the given environment. Furthermore, the receivers utilise the midambles for reception regardless of the actual propagation conditions.

As a consequence these communication systems end up including training data sufficient for the worst case propagation conditions and Bug channel estimation or synchronisation algorithms relying on this information always being present. The training data typically take up a significant proportion of the channel capacity thus causing a significantly reduced user information data rate. As an example the overhead associated with midambles in GSM is 23% of the data rate.

This approach is very wasteful in terms of data capacity and there is a need for an improved method of operation of the communication system.

European Patent Application Publication EP-A-0 615 352 (Nokia Mobile Phones Ltd) discloses a radio phone system utilising an adaptive training sequence whereby the length or structure of the training sequence is altered. However the radio phone system requires that both receiving and transmitting stations are compatible with an adaptive training sequence and therefore cannot be used far example with a GSM system which includes standard GSM handsets as these rely on a fixed training sequence.

SUMMARY OF THE INVENTION

Accordingly, the invention seeks to provide an increased data rate throughput for a communication system by more flexibly structuring the distribution of user data and training data.

According to a first aspect of the invention, there is provided a method of increasing a data rate in a communication system operating in a radio environment with certain propagation characteristics using repeated predetermined training data (205) and including a first central station (101) and a first remote unit (103) with certain training data requirements, and a second remote unit (107) with different training data requirements, and said first central station (101) and said first and second remote unit (103,107) each containing a receiving unit and a transmitting unit for communication over radio channels (105), the method comprising the steps of: a) determining (303) the propagation characteristics; b) determining (305) a training data structure; c) transmitting using said training data structure; and d) receiving using said training data structure said method being further characterised by the steps of e) determining (301) the training data requirements of the first remote unit and the second remote unit; and the determined training data structure being dependent on the determined propagation characteristics and the determined training data requirements.

The communication system may be a GSM cellular communication system and the repeated training data a midamble. Preferably, the midamble structure is determined from standard GSM measurements.

According to a different aspect of the invention there is provided An apparatus for a communication system operating in a radio environment with certain propagation characteristics using repeated predetermined training data (205) and including a first central station (101) and a first remote unit (103) with certain training data requirements, and a second remote unit (107) with different training data requirements, and said first central station (101) and said first and second remote unit (103,107) each containing a receiving unit and a transmitting unit for communication over radio channels (105), the apparatus comprising a) means for determining the propagation characteristics; b) means for determining a training data structure used by the transmitting units and the receiving units, said apparatus being further characterised by comprising means for determining the training data requirements of the first remote unit and the second remote unit; and by the determined training data structure being dependent on the determined propagation characteristics and the determined training data requirements.

According to this invention the training data structure can be matched to the training data requirements of the individual remote unit and the current propagation environment, and it is thus not required that the training data structure is determined by the worst case conditions.

DETAILED DESCRIPTION OF A PREFERRED EMBODIMENT

Figure 1:
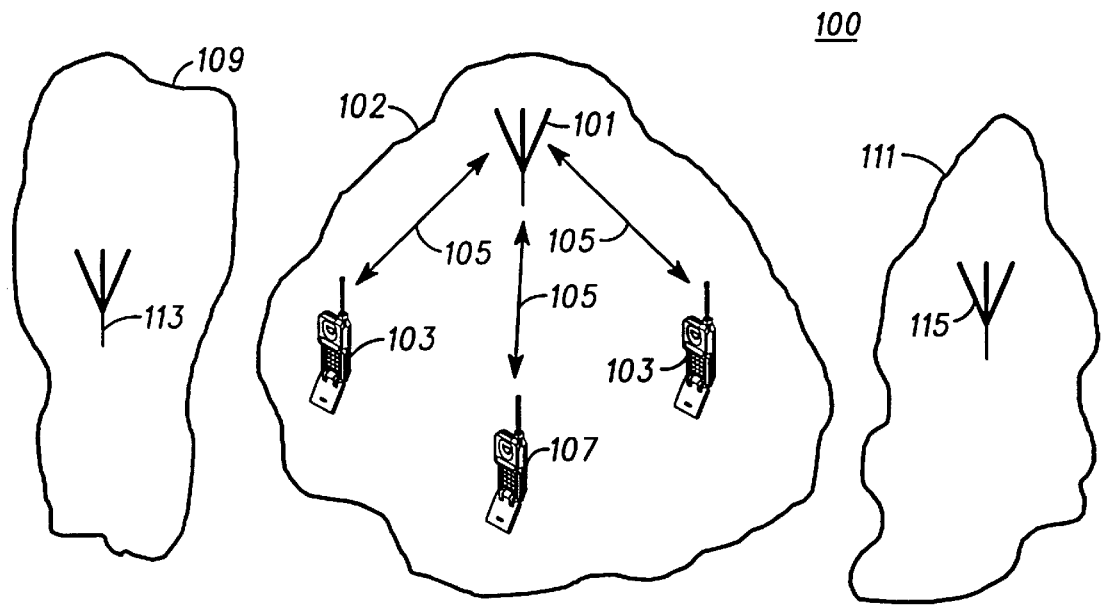
FIG. 1 is an illustration of a typical communication system to which this invention may apply.

According to the present invention, a method is provided for improving data capacity by selectively eliminating training data in a communication system 100 using repeated predetermined training data, and comprising at least one central station and remote units typically having different training data requirements. FIG. 1 illustrates such a system where a central station 101 communicates with a number of remote units 103,107 over radio channels 105. Each remote unit and each central station contains a receiving unit and a transmitting unit. Specifically, the communication system may be a cellular system where the central station covers users within a certain geographical area 102 whereas other geographical areas 109,111 are covered by other central stations 113,115. An example of such a system is the GSM cellular system widely deployed for mobile communications.

On the radio channels 105, a training data structure is given by repeatedly including predetermined training data. The remote units can be different types so that some remote units 107 have less requirements for training data than other remote units 103. For example, some remote units may only implement one channel estimation or synchronisation algorithm relying on one specific predetermined training data structure while other remote units may be able to employ a plurality of algorithms based on different training data structures. The training data structure may thus be different for different radio channels dependent on which type of remote unit 103 or 107 is involved in the communication.

As examples of the parts constituting the system the central stations could for example be an M-CELL™ GSM basestation available from Motorola Limited and modified according to the present invention to operate with a non-standard GSM training data structure. The remote units 103 could be standard GSM handsets as for example the Motorola™ StarTac™ cellular phone. Other units can be GSM handsets such as the Motorola™ 8700 or the Motorola™ StarTac™ cellular phone modified according to the invention to operate with alternative training scheme protocols.

In general, the method of the present invention is characterised by determining the training data requirement of each individual remote unit 103,107 and thereby the restrictions imposed on the choice of training data structure by the units. In addition the propagation characteristics for the radio environment are determined, either for the entire environment or for each individual radio channel 105. Based on this, the training data structure for each individual radio channel is setup, preferably employing the minimum amount of training data required for maintaining an adequate transmission quality. This allows increased user data rate for each individual radio channel as capacity previously used up by training data now can be used for user data, thus increasing the data capacity of the entire system.

Figure 2:
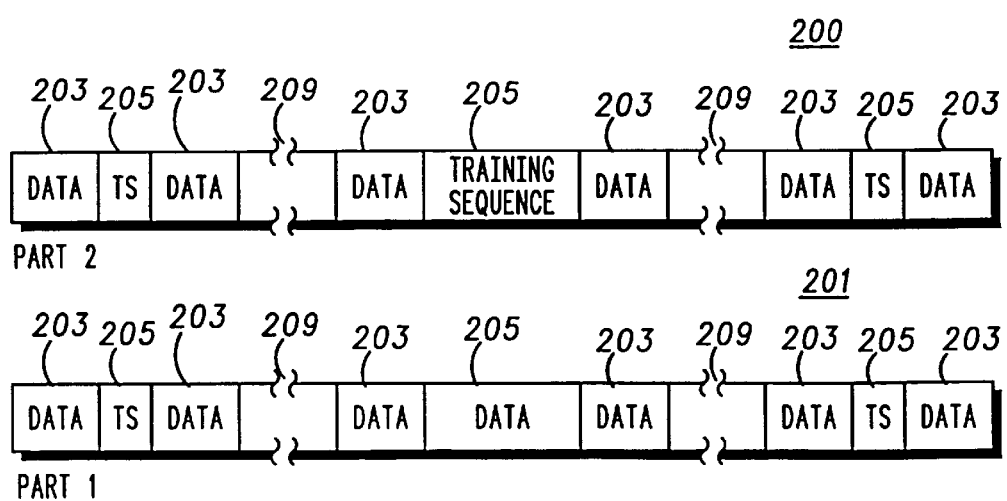
FIG. 2 is an illustration of a preferred embodiment of how data and training data may be structured according to the present invention.

An example of adjusting the training data structure is illustrated in FIG. 2 in which part 1 shows a standard GSM burst structure. A GSM burst consists of two blocks of data 203 surrounding a midamble 205 containing the training data. In-between consecutive bursts to the same remote unit is an interval 209, which can be variable but in GSM is equal to seven data bursts (including guard bands), in which the basestation communicates with other users. According to the invention the midamble may be replaced by data if the propagation characteristics and training data requirement of the central station and remote units permit, as illustrated in FIG. 2 part 2 where the entire midamble of the second burst is replaced by data 207. In this example the midamble is still present in the surrounding bursts and the channel estimation being derived for these bursts can be used in the demodulation of data in the current burst.

The receivers and transmitters of both the remote units 103,107 and the central station 101 are modified to support the applied training data structure for the individual radio channel thus enabling reception of the additionally transmitted data.

Figure 3:
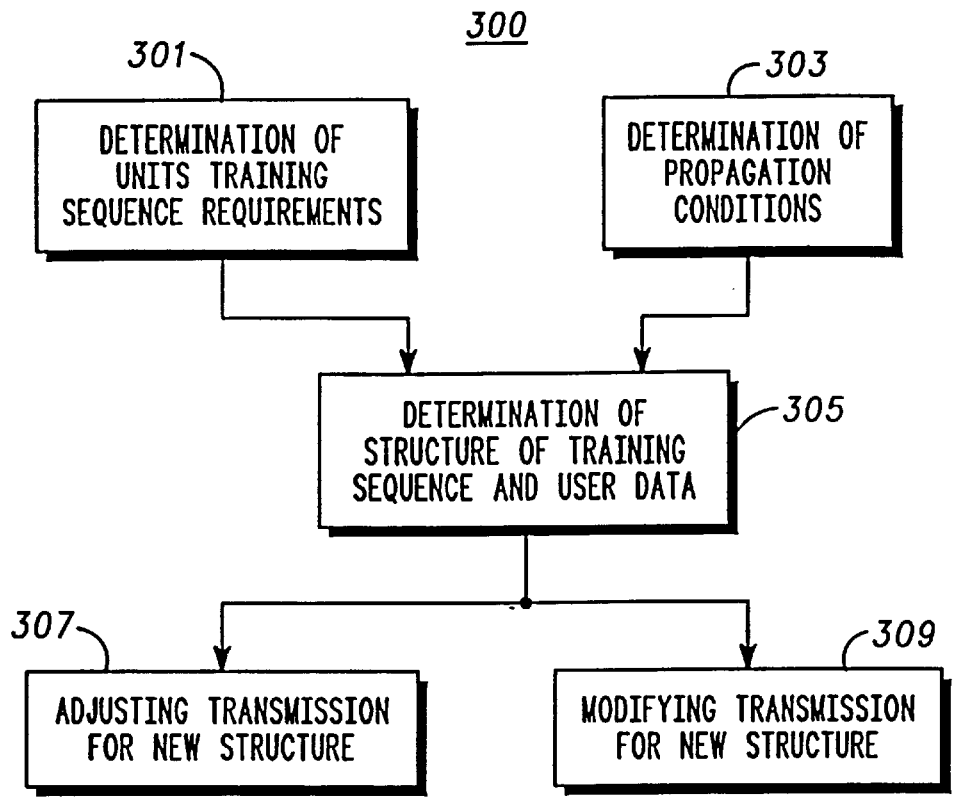
FIG. 3 is an illustration of a process flowchart of a preferred method of increasing data rate according to the invention.

FIG. 3 is an illustration of a process flowchart 300 of a preferred embodiment of the invention. The process can be implemented in a controller in a central station or in the remote units or can be spread throughout the communication system in a plurality of controllers.

The process starts in step 301 where the training data requirements of the individual remote unit and possibly the central units are determined as these may vary between units. The selection of training data structure will also be limited by the propagation characteristics and these are determined in step 303. On the basis of these two steps a suitable training data structure is determined in step 305 and then applied to the transmitting unit 307 and receiving unit 309 of the current radio channel. Depending on the specific embodiment the steps of determining the training data structure and applying these to the receiving unit and transmitting unit may also include means for transmitting information from the controller(s) to the units. The described method can be applied independently to the uplink and downlink of the individual radio channel.

The step 301 of determining the training data requirements of the individual unit for operating with different training data structures can be achieved in different ways.

A first alternative is for each remote unit and central station to have this information stored in memory, the information being transmitted by each remote unit 103,107 to the central station 101 possibly over the radio channels 105. The information is thus predetermined for each unit and communicated directly to one or more controllers in charge of determining the applicable training data structure according to step 305. This communication can alter-natively be performed once for every new mobile, every time a mobile registers on the network, or during call initialisation. If the communication is performed over the radio channels 105, it is preferred that a default predefined training data structure is used initially enabling communication without knowing the requirements of the specific units involved in the call. For example, for a GSM communication system the mobile terminals can communicate this information to the base station during mobile registration using standard GSM bursts all of which contains midambles. At call setup a different training data structure can be determined for instance allowing the midamble of every alternate burst being replaced by user data.

A second alternative method for the training data requirement of the individual receiver to be determined is by applying different training data structures to the transmission without any prior knowledge of the requirements of the receiver, and monitoring the resulting transmission quality. If acceptable transmission quality is not achievable, this indicates that the current scheme cannot be applied to this specific radio channel. As a specific example, if a GSM communication system is considered, a sequence of bursts with for example every other midamble removed can be transmitted from the basestation. Instead of the midamble the base station will transmit a flag indicating to the mobile terminal that midamble less transmission is ongoing, or the process can follow a predefined protocol known to receivers capable of midamble free reception. If the receiver is not capable of midamble free reception this will result in a very high bit error rate, which when reported back to the base station will indicate that midamble free transmission is not feasible for this radio channel. An advantage of this alternative is that there is no requirement for older units not designed to take advantage of the present invention to be modified.

The step 303 of determining the propagation environment may be achieved by an initial characterisation of the radio environment. This can be done by performing measurements in the given environment or alternatively the radio propagation environment can be estimated from knowledge of equivalent environments. For example, if the system will be deployed in low speed indoor environments, it is well known that delay spreads are typically less than 300 ns and channel coherency times typically several hundreds of milliseconds. This is often sufficient for determining the restrictions imposed on the training data by structure the propagation environment. If desired, more specific measurements of for example the delay spread in the room where the system is deployed can be used.

An alternative for step 303 is to continually evaluate the propagation environment or more specifically each of the individual radio channels 105. In this alternative the training data will thus be adapted to the instantaneous conditions on the individual radio channel. The preferred method of continually evaluating the propagation environment is to measure an indicator of the transmission quality such as the received errors, channel estimates, received power, channel estimate noise or the signal to noise ratio. The absolute value of these estimates will reflect the transmission quality for the current propagation conditions and hence can be used for determining the training data requirements. In addition the rate of change of these parameters can be evaluated and this indication of the rate of change of the propagation conditions can be used for determining the frequency of training data. An example is a system which continually measures the bit error rate of the received transmission. Following the reception of a training data sequence, the bit error rate will increase steadily as the channel estimate generated by this training data becomes increasingly inaccurate. The system will then use this measure to include a new training data when the bit error rate increases above a certain level as this is an indication that the propagation conditions have changed sufficient for the previous channel estimate to be insufficient.

The step 305 of determining a suitable training data structure depending on the previous two steps 301,303 can be a very simple protocol listing suitable training data structures for given propagation characteristics, and the training data can be chosen as the optimum sequence, preferably the least capacity demanding sequence, for which the units training data requirements are compatible. This protocol is preferably known to both central stations and applicable remote units, whereby the receivers will have knowledge of when training data are present. In the simplest form this protocol is a predetermined protocol which is permanently used for the given radio environment. A more sophisticated protocol consists of a number of different variants between which is chosen dependent on the instantaneous propagation characteristics, or the protocol can even be adaptive and changed according to the requirements of the system and propagation characteristics. A very simple example of this method is a GSM system which can be deployed either in a high speed urban environment or in a low speed indoor environment. The determination of training data can be achieved by a simple protocol stating that if for the propagation environment is high speed urban midambles shall be included in all bursts, but if the environment is a low speed indoor environment the transmission may either have midambles in all bursts or may discard the midamble in every alternate burst depending on the midamble requirements of the central station and the remote unit of the given radio channel.

An alternative method for controlling the training data structure is to have a feedback loop where the receiver reports back to the transmitter thereby controlling the applied training data structure. The previously described example of inserting training data when the bit error rate reported back from the receiver increases above a certain threshold is an example of this approach. Another example is where the receiver independently evaluates the need for training data and specifically requests a training data sequence to be transmitted. In this case training data are only transmitted when specifically requested by the receiver through the feedback loop.

A possible implementation of the feedback scheme in a GSM system is to utilise the standard reporting performed by the GSM mobile and basestations according to the GSM specifications. This reporting includes measurement reports of received signal level, bit error rate etc. As a specific example analogous to the previously described, the basestation may leave out midambles as long as the standard GSM measurement for bit error rate, RxQual, reported back from the mobile terminal is acceptable, and include midambles when the reported values become unacceptable. The uplink midamble synchronisation can likewise be controlled from the power control information transmitted from the basestation so that midambles are omitted until the transmission quality degrades to the extent that the basestation requests the mobile terminal to increase the power level above a predefined threshold.

An advantage of using the feedback algorithm is that the receiver automatically will know when to expect a training data sequence as the inclusion of these are controlled by the receiver itself. For example, when the receiver reports a bit error rate on the reverse link above the defined threshold it will know that the transmitter will include a training data sequence in the following bursts.

The system will preferably include only one controller for determining the training data for each radio channel, preferably based in the central station. In this case the structure of the training data is communicated to the remote units preferably over the radio channels using a default structure for training data.

Adjusting the transmission to include the different training data structures can be achieved by including flexible multiplexing means for multiplexing between user data and training data as is well known in the art. An example is to store the training data in memory and store the data in a First In First Out buffer. A multiplexer can then clock data out from either the training data memory or the data buffer dependent on the chosen training data structure. The skilled person may substitute any known method of multiplexing user data and training data, without detracting from the present invention as defined by the appended claims.

Modifying the reception to operate with the different training data structures may be achieved in many ways and methods are well known in the art. These methods include deriving channel estimates with the aid of training data sequences transmitted previously. The channel or synchronisation estimates generated from this information are directly used as the current channel estimates, or they are filtered over a longer duration possibly by using a prediction filter before being used as channel estimates. Channel estimates can also be generated by delaying the demodulation and interpolating between past and future estimates. The skilled person may substitute any known method of multiplexing user data and training data, without detracting from the present invention as defined by the appended claims.

A preferred embodiment of the invention is in a TDMA and specifically a GSM communication system where remote units with reduced training data requirements are introduced. The preferred method of reducing the training data overhead for a GSM system will be to reduce the midamble or possible omit the midamble completely in a given fraction of the data bursts. In the case of low delay spread in a GSM system, which is applicable to typical indoor environments, the midamble can be reduced from 26 to 16 bits with no loss in channel estimation accuracy. This reduced midamble burst can be received by a standard GSM receiver by limiting the correlation window of the channel estimation.

An alternative implementation of the invention constitutes a GSM cellular communication system where the above mentioned methods are utilised to increase the user data rate of the system thereby enabling the ability to use a higher rate speech coder thus improving the speech quality of the system. For example, if used in an indoor environment with large burst coherency the midamble of for example two out of three bursts can be replaced by user data resulting in a constant data throughput which is significantly higher than for standard GSM. By using the increased data throughput for coded speech, it is possible to use a higher rate speech coder which has improved speech quality over the standard GSM coder. In addition, speech coders exist which adaptively can alter the rate depending on the available data rate of the channel. According to the present invention the data throughput of the available radio channel may be optimised depending on the propagation characteristics as described previously. This may be done dynamically during a call, and by using an adaptive multi rate speech coder to utilise as much as possible of the current capacity, the speech quality of the system may be optimised dynamically.

Another alternative implementation constitutes improving the measurement reporting in a GSM communication system. In current GSM systems, the measurements and transmission quality values being reported are very limited. Many measurements providing improved system performance in terms of transmission quality and resource utilisation can be made including measurements of interference in different channels, signal to noise ratios, neighbour cell traffic carrier signal level etc. Adopting the method described above, this additional system information can be communicated between the mobile terminals and the basestation by replacing midamble with measurement data. The additional measurements can be used for improving handovers, channel allocation etc. As a specific example, the mobile terminals may measure the interference levels on the traffic channels of neighbour cells and report these to the basestation. During handover it is thus possible to allocate the mobile station directly to the traffic carrier which yields the least interference to the mobile station and thus allowing the least transmit power to be used.

In current GSM systems, limitations are likewise imposed by the restrictions of the control information which is exchanged between basestation and mobile terminals. An improved system performance can be achieved removing this limitation by replacing midamble information with additional control messages. For example, these control messages could direct the mobile to retune and measure signal levels for specific frequencies as requested by the central station. This could include the transmit frequencies of other remote units thus providing the central station with information indicating the remote units position with respect to each other.

Figure 4:
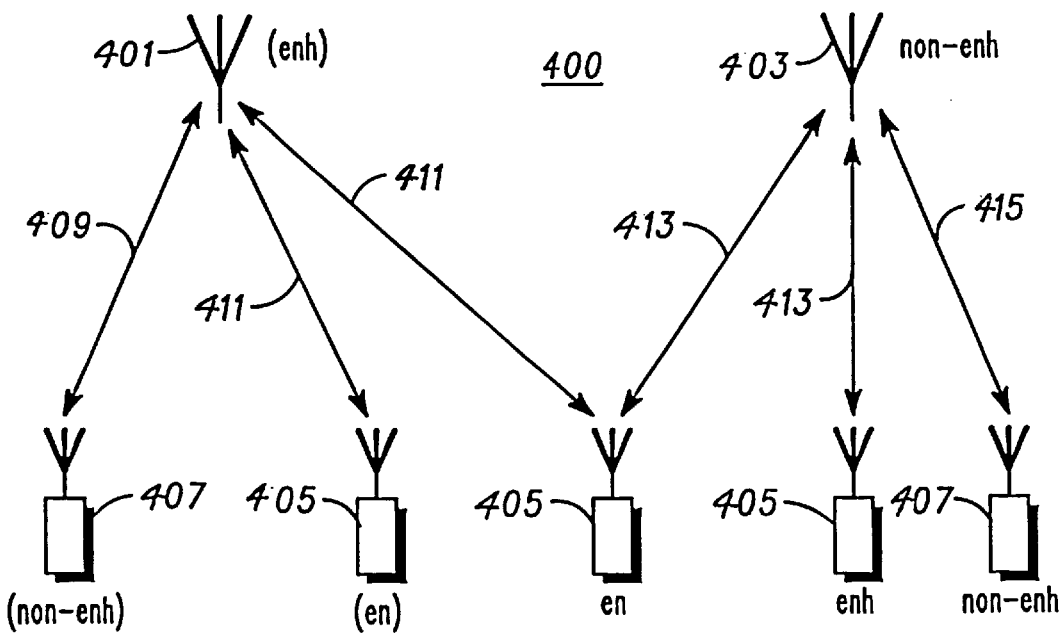
FIG. 4 an illustration of GSM cellular system including both standard and enhanced units to which this invention may apply.

An alternative preferred embodiment of the invention is illustrated in FIG. 4 and constitutes a GSM cellular communication system used in for example low speed indoor environments comprising standard GSM mobile terminals 407, enhanced GSM mobile terminals 405, standard basestations 403 and enhanced basestations 401, the enhanced units being characterised by being able to transmit data instead of midamble and being able to receive GSM signals with midamble replaced by user data. The indoor GSM radio environment is characterised by the propagation conditions changing slowly with respect to the GSM framelength, and a large degree of burst to burst coherency is therefore present. It is thus not necessary to transmit midambles in every burst for communication between enhanced mobiles and basestations, which allows for transmission of additional data instead. The system will therefore whenever possible, i.e. when an enhanced basestation 401 is communicating with an enhanced mobile terminal 405, use a reduced training data scheme and transmit additional user data.

Using one of the methods described previously, the enhanced mobile terminals 405 and basestations 401 will determine whether they are communicating with another enhanced unit or not. They will accordingly determine whether to use an enhanced protocol or revert to the standard GSM protocol. All transmission links 409,413,415 including a non-enhanced unit will adhere to the GSM standard and include midambles in all data bursts. The enhanced basestation 401 and mobile terminal 405 will thus function exactly as standard GSM products when not specifically used together. An enhanced basestation 401 can serve both non-enhanced mobile terminals 407 present in the coverage area as well as serving enhanced mobile terminals 405 with improved performance. Likewise, an enhanced mobile terminal 405 can be used in any environment with any basestation 401, 403 but will provide increased performance when used with an enhanced basestation 401.

The invention thus allows for improved performance for enhanced mobiles in an enhanced basestation environment while being fully compliant and backwards compatible with the current GSM specification.

What is claimed is:

1. A method of increasing a data rate in a communication system operating in a radio environment with certain propagation characteristics using repeated predetermined training data (205) and including a first central station (101) and a first remote unit (103) with certain training data requirements, and a second remote unit (107) with different training data requirements, and said first central station (101) and said first and second remote unit (103,107) each containing a receiving unit and a transmitting unit for communication over radio channels (105), the method comprising the steps of:

a) determining (303) the propagation characteristics;
   b) determining (305) a training data structure;
   c) transmitting using said training data structure; and
   d) receiving using said training data structure said method being further characterised by the steps of
   e) determining (301) the training data requirements of the first remote unit and the second remote unit; and
   the determined training data structure being dependent on the determined propagation characteristics and the determined training data requirements.

2. A method of increasing a data rate as claimed in claim 1 wherein the communication system is a GSM cellular communication system and the repeated training data (205) is a midamble.

3. A method of increasing a data rate as claimed in claim 2, wherein the GSM cellular communication system uses standard GSM measurements reported from the receiving unit according to a GSM specification and characterised in that said midamble structure (205) is determined from said standard GSM measurements.

4. A method of increasing a data rate as claimed in claim 1, characterised by the training data requirements of said first and second remote unit (103,107) being predetermined and communicated to said first central station (101).

5. A method of increasing a data rate as claimed in claim 1, wherein said first and second remote unit (103,107) and said first central station (101) are receiving at a quality level, and step e is characterised by sequentially applying specific training data structures and determining the training data requirements from said quality level.

6. A method of increasing a data rate as claimed in claim 1, wherein step a (303) is characterised by the propagation characteristics being predetermined.

7. A method of increasing a data rate as claimed in claim 1, characterised by the training data structure being dynamically modified during a call.

8. A method of increasing a data rate as claimed in claim 1, characterised by the propagation characteristics being determined by evaluating an indicator selected from the group consisting of:

a) received errors;
b) channel estimates;
c) received power;
d) channel estimate noise; and
e) signal to noise ratio.

9. A method of increasing a data rate as claimed in claim 1, characterised by the training data structure being determined by the transmitting unit inserting a training data sequence when a request is sent back from the receiving unit.

10. An apparatus for a communication system operating in a radio environment with certain propagation characteristics using repeated predetermined training data (205) and including a first central station (101) and a first remote unit (103) with certain training data requirements, and a second remote unit (107) with different training data requirements, and said first central station (101) and said first and second remote unit (103,107) each containing a receiving unit and a transmitting unit for communication over radio channels (105), the apparatus comprising:

a) means for determining the propagation characteristics;
b) means for determining a training data structure used by the transmitting units and the receiving units, said apparatus being further characterised by comprising means for determining the training data requirements of the first remote unit and the second remote unit; and by the determined training data structure being dependent on the determined propagation characteristics and the determined training data requirements.

* * * * *